United States Patent
Byrnes et al.

(10) Patent No.: US 6,912,579 B2
(45) Date of Patent: Jun. 28, 2005

(54) SYSTEM AND METHOD FOR CONTROLLING AN APPARATUS HAVING A DEDICATED USER INTERFACE FROM A BROWSER

(75) Inventors: Nigel J. Byrnes, Reigate (GB); Leonard H. Poll, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 763 days.

(21) Appl. No.: 09/734,782

(22) Filed: Dec. 12, 2000

(65) Prior Publication Data

US 2001/0005865 A1 Jun. 28, 2001

(30) Foreign Application Priority Data

Dec. 24, 1999 (GB) .............................. 9930851

(51) Int. Cl.[7] .............................................. G06F 15/16
(52) U.S. Cl. ........................ 709/227; 709/217; 709/228; 709/250; 707/10
(58) Field of Search ................................ 709/200, 203, 709/217–219, 227–229, 230, 250; 707/10; 717/107–108, 121

(56) References Cited

U.S. PATENT DOCUMENTS

| | | | | |
|---|---|---|---|---|
| 5,428,791 A | * | 6/1995 | Andrew et al. | 717/121 |
| 5,854,624 A | | 12/1998 | Grant | 345/169 |
| 5,878,418 A | * | 3/1999 | Polcyn et al. | 707/10 |
| 5,884,246 A | * | 3/1999 | Boucher et al. | 709/206 |
| 6,185,600 B1 | * | 2/2001 | Spence et al. | 709/203 |
| 6,201,538 B1 | * | 3/2001 | Wugofski | 709/217 |
| 6,233,608 B1 | * | 5/2001 | Laursen et al. | 709/217 |
| 6,292,657 B1 | * | 9/2001 | Laursen et al. | 709/219 |
| 6,292,833 B1 | * | 9/2001 | Liao et al. | 709/229 |

FOREIGN PATENT DOCUMENTS

| | | | | |
|---|---|---|---|---|
| EP | 0779759 A2 | 6/1997 | ........... | H04L/12/28 |
| WO | WO9856151 | 12/1998 | ............ | H04M/1/00 |

OTHER PUBLICATIONS

By P.M. Corcoran et al, "User Interface Technologies for Home Appliances and Networks", IEEE Trans. on Consumer Electronics, vol. 44 No. 3, PP 679–685M, Aug. 1998.

By S. Narayanaswamy et al, "Using Data on Digital Cellular and PCS Voice Networks", Bell Labs. Technical Journal vol. 3, No, pp 58–75, Apr.–Jun. 1998.

By D. L. Atkins et al, "Integrated Web and Telephone Service Creation" Bell Labs. Technical Journal vol. 2, No. 1, PP 19–35, Winter 1997 (Abstract Only).

* cited by examiner

*Primary Examiner*—Bharat Barot

(57) ABSTRACT

In a system for controlling an apparatus having a dedicated user interface, where parts of the dedicated user interface communicate with each other using a dedicated user interface message protocol, the system comprises a browser adapted to display a generic user interface, to issue requests due to user interaction with the generic user interface and to accept notifications comprising data or events. A translation system is configured to receive issued requests, to translate the requests and to communicate them using the dedicated user interface message protocol to one of the parts of the dedicated user interface, and to receive communications from the parts of the dedicated user interface using the dedicated user interface message protocol, to translate the communications into notifications and to pass them to the browser.

20 Claims, 3 Drawing Sheets

| Length | Orig. Address | Dest. Address | APPI Message |

SYSTEM AND METHOD FOR CONTROLLING AN APPARATUS HAVING A DEDICATED USER INTERFACE FROM A BROWSER

The present invention relates to apparatus control systems, in particular the present invention relates to user interfaces for mobile telephones.

Features offered by computer and telephony apparatus are rapidly converging. A cheap home computer is now capable of interaction with the outside world, in particular, by enabling access to the Internet and the World-Wide Web (WWW), whilst telephones are now beginning to offer similar connectivity to the outside world.

Current moves to increase the functionality that mobile telephones offer include the introduction of WWW access. Whilst User Interface (UI) components used by the browser are likely to be similar to those used in the UI to control the telephone, the look-and-feel perceived by the user is not guaranteed to be equivalent, which is not good usability practice. However, the memory and computer processor resources typically available in a mobile telephone are limited due to cost, size and weight considerations. In order to make the best use of the limited resources, a specific UI is implemented for each mobile telephone type. This is often done at machine code level to take best advantage of available resources. By tailoring the UI application, the programmer can implement the UI to take advantage of any features the telephone has whilst avoiding redundant code and features that a generic UI would require in order to support differing mobile telephone models with differing feature sets and code bases. Major disadvantages of tailored UI applications include: the time and cost to develop the UI application each time a new telephone is developed; the overheads in maintaining and updating each UI application to fix bugs or support additional telephone hardware or telephone network features; and, the individuality of each UI application given that a programmer's style normally impacts on the operation and appearance of the UI thereby resulting in differences in UI's in different mobile telephone types.

The WWW has evolved and unified to the extent that there are now well defined open standards for client-server communication (typically using the HyperText Transport Protocol, HTTP), page format (primarily HyperText Markup Language, HTML, or an improvement thereon) and underlying functionality (commonly implemented in Java, JavaScript, VBScript or Active Server Pages). Interactive features of the WWW such as links between pages are commonly implemented to have the same appearance across the WWW due to user expectations of how the link should appear (normally a button or underlined Universal Resource Locator (URL) address). However, the WWW was primarily intended for full-scale computers, such as PC's, with ample memory, fast processor, a permanent storage capacity and keyboard/mouse-type input devices. WWW browsers implemented to permit users of PC's to access the WWW are commonly resource hungry and push the resources of many older PC's to the limit. In order to enable users to access the WWW via mobile telephones with their limited display area, memory and processors, a new type of browser (known as a micro-browser) has been developed specifically to run on small devices like mobile telephones. Compared to fourth-generation browsers (like Netscape v4), micro-browsers have reduced capabilities and functionality and are written to transparently interface and use existing mobile telephone features to access the WWW using the mobile telephone's input device and limiting overall power consumption.

The connection to the WWW using the mobile telephone presents a further problem in that wireless data networks tend to have less available bandwidth, more latency, less connection stability and less predictable availability. Designed with these characteristics in mind, new transport protocols have been developed to enable communication between the mobile device and the network. One of the first protocols, HDTP (developed by Unwired Planet), is still in use alongside newer technology specified by the WAP Forum. To enable the mobile device to access WWW-content, a gateway exists at the mobile telephone provider's receiver which encodes/decodes HTTP traffic into HDTP/WAP traffic and vice-versa. The micro-browsers implemented to support these protocols have similar limitations to the UI applications in that the micro-browser must be adapted for each new mobile telephone type in order to run on the telephone and to be able to control the mobile telephone to make connections to the gateway and transmit and receive data.

Whilst attempts have been made to implement a UI which operates as a micro-browser as well, the micro-browser becomes tied to the mobile telephone type in the same way as the UI applications are. Furthermore, the above protocols were not intended to be used to communicate with the rest of the mobile telephone, being unable to generate HDML pages dynamically, support animations or respond to asynchronous events such as incoming calls.

According to one aspect of the present invention, there is provided a system for controlling an apparatus having a dedicated user interface, parts of the dedicated user interface communicating with each other using a dedicated user interface message protocol, the system comprising a browser adapted to display a generic user interface, to issue requests due to user interaction with the generic user interface and to accept notifications comprising data or events, and a translation system configured to receive issued requests, to translate the requests and to communicate them using the dedicated user interface message protocol to one of the parts of the dedicated user interface, and to receive communications from the parts of the dedicated user interface using the dedicated user interface message protocol, to translate the communication into notifications and to pass them to the browser.

By overlying a browser-based user interface on an existing interface, existing web command structure, technology and, most importantly, look and feel can be used to provide generic user interfaces. An important aspect of the present invention is that the existing user interface remains hidden under the browser meaning that a browser-based user interface need not be specifically written for each telephone type, the browser need only be adapted to communicate with the existing user interface.

The browser preferably includes a communications handler configured to accept notifications comprising data or events and to issue the requests due to user interaction with the generic user interface, wherein the communications handler determines the request type and, if the request relates to World Wide Web browsing, the communications handler transmits the request to a World Wide Web server, otherwise the communications handler passes the request to the translation system.

The browser is preferably a World Wide Web micro-browser.

The browser may be an HDML micro browser.

Requests issued due to user interaction with the generic user interface may comprise HDML "Get" messages.

Requests relating to the generic user interface may comprise applicative messages embedded within the HDML Get messages.

The translation system is preferably configured to retrieve the applicative message from the HDML Get messages, attach it to an electronic delivery envelope determined in dependence on the type of the applicative message in accordance with the dedicated user interface message protocol and to communicate it to one of the parts of the dedicated user interface.

Notifications may comprise HDML "x-up-notify" messages.

Notifications relating to the generic user interface may comprise applicative messages embedded within the HDML x-up-notify messages.

A received communication from the parts of the dedicated user interface may comprise one or more applicative messages attached to an electronic delivery envelope in accordance with the dedicated user interface message protocol, wherein the translation system is configured to retrieve the applicative message(s), embed them within an x-up-notify message and pass the message to the communications handler.

The communications handler preferably includes a page generator, wherein the communications handler passes received x-up-notify messages to the page generator which, in dependence on the embedded applicative message(s), generates an HDML page and passes the HDML page within an x-up-notify message to the browser for action.

Preferably, the apparatus comprises a mobile telephone.

Preferred embodiments of the present invention will now be described, by way of example only, and with reference to the accompanying drawings, in which.

Figure 1:
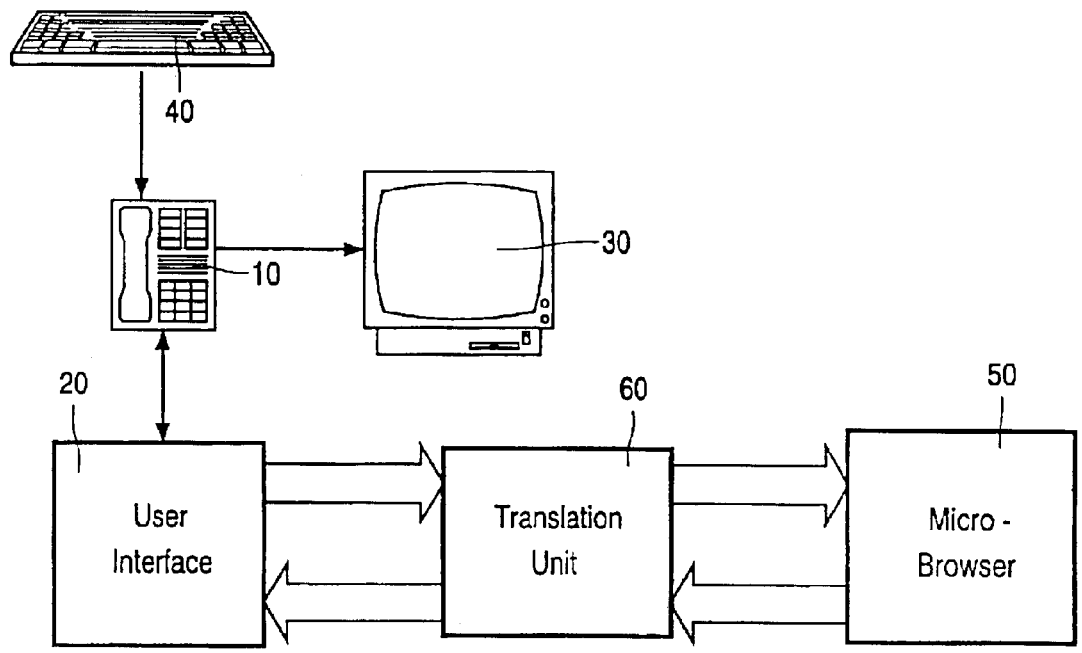
FIG. 1 is a schematic diagram of a mobile telephone control system according to the present invention.

FIG. 1 is a schematic diagram of a mobile telephone control system according to the present invention. A mobile telephone 10 includes an embedded user interface 20 for controlling features of the telephone and for interaction with the user via a display area 30 and an input device 40. A micro-browser 50 is implemented transparently to the user interface 20 enabling the user to access the WWW. A translation unit 60 interfaces the micro-browser 50 to the user interface 20. A user controls the mobile telephone by entering commands via the micro-browser 50. The micro-browser 50 is used for all user interaction including tasks such as accessing an address book, making a telephone call or accessing the World Wide Web. Micro-browser commands are processed by the translation unit and translated into corresponding user interface commands. Vice-versa, events generated by the mobile telephone 10, such as incoming calls, SMS messages or received WWW pages, are notified by the user interface 20 to the translation unit 60. The events are processed by the translation unit 60 and translated into corresponding micro-browser events which are passed to the micro-browser 50.

Figure 2:
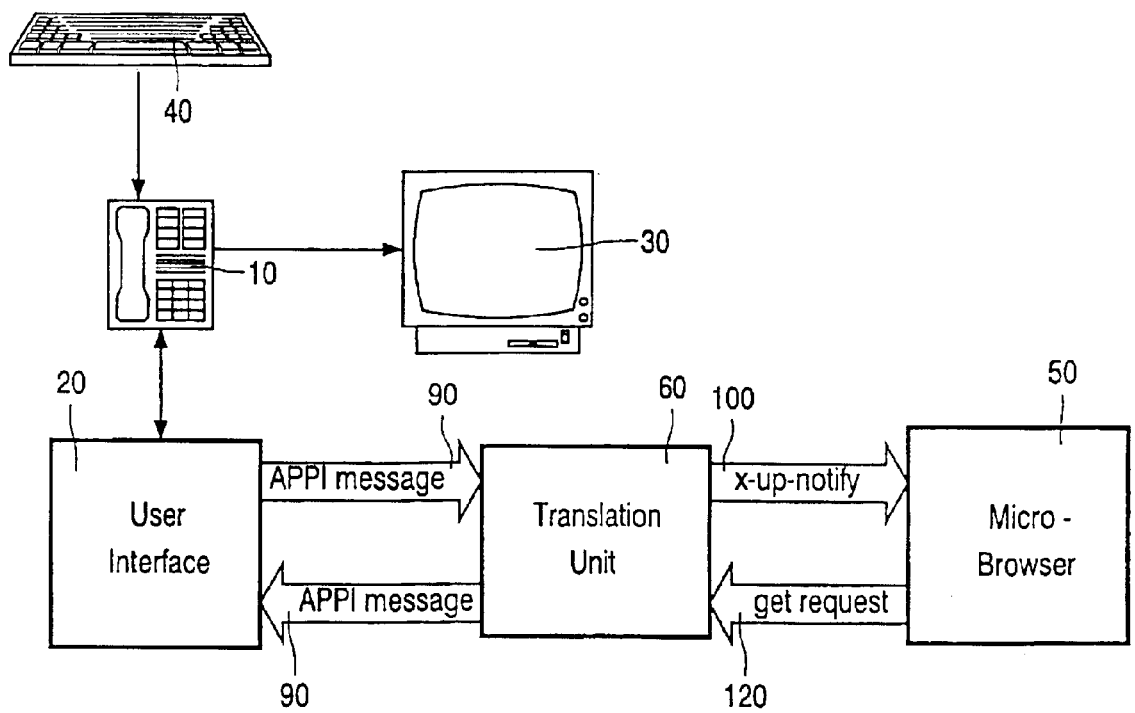
FIG. 2 is a schematic diagram of a specific embodiment of a mobile telephone control system in accordance with an aspect of the present invention.

FIG. 2 is a schematic diagram of a specific embodiment of a mobile telephone control system in accordance with the present invention. The mobile telephone 10 is, for example, a Philips Spark mobile telephone which has a user interface 20 defined by an APPI (Application Interface) Message Protocol. Applications running on the telephone communicate with and control the telephone by sending APPI applicative messages to the APPI. Vice-versa, the mobile telephone communicates with applications by sending applicative messages from the APPI to the applications.

A micro-browser 50 implemented using the HDML protocol runs on the mobile telephone 10. Messages, requests and events are passed between the translation unit 60 and the user interface using applicative messages. In this manner, each time the browser 50, or any other on-phone application, needs to communicate with the telephone 10, an applicative message is sent by the translation unit 60 across the APPI. Using an optional feature of applicative messages, data is associated with the messages sent.

Communication between the micro-browser 50 and the translation unit 60 is performed using x-up-notify messages 100 from the translation unit 60 to the micro-browser 50 and get request messages 120 from the micro-browser 50 to the translation unit 60. The two message types are defined in the HDTP protocol and are discussed further below with reference to FIG. 3.

The micro-browser 50 includes a communications handler 200, responsible for transmission and reception of data for the micro-browser 50, and an HDML interpreter 205, responsible for user interaction with WWW pages on the micro-browser 50 and issuing commands/requests due to user interaction. When the micro-browser 50 needs to send events or requests to the WWW server (not shown), such as when a WWW page is requested by a user, a Get request message is passed to the translation unit 60. A Get request message is a PDU (protocol data unit) analogous to the HTTP GET method. The message instructs the WWW server to get whatever information is associated with a given URL. The HDML interpreter 205 assembles the Get request, including the URL of the requested page, and passes it to the communications handler 200. The communications handler identifies the standard HDTP Get format and transmits it to the WWW server.

If, however, the event or request is not a simple request for a WWW page corresponding to a URL, data associated with the event or request is embedded inside a Get request. For example, a WWW page may be embedded in the micro-browser 50 allowing the user to enter telephone numbers and/or select them from a WWW based telephone book and dial via the micro-browser 50. On entering the number, an HDML card (an HDML micro-browser's version of an HTML page) containing the telephone number entered as one or more applicative message is held within the cache of the HDML micro-browser 50. When the user chooses to call the number by, for example, clicking a call button on the page, the HDML card is read by the HDML micro-browser's interpreter 205 which embeds the applicative message(s) into a Get request and passes it to the communications handler 200 for further action. If, as in the present case, the communications handler 200 determines that the Get request contains an applicative message and should therefore not be transmitted to the WWW server, it passes it to the translation unit 60. The translation unit 60 processes the Get request and transmits across the APPI.

Examples of applicative messages to be transmitted across the APPI may include:

APPI_call_setup_req—after manually entering a telephone number from the telephone's idle state, a user's request to call that number results in this message being formatted and transmitted across the APPI;

APPI_dir_delete_req—When browsing through messages, the user is presented with an on-screen menu. Should he select delete, this message is formatted and transmitted across the APPI to perform the required action.

When trying to change the ringer type, the user navigates through the list of possible ringer types listening to each ringer as it is selected. In this instance, APPI messages are transmitted in order to play the next ringer type and also to set the ringer type once selected.

As all browser generated applicative messages are transmitted upon a keypress or menu selection from an HDML card, all information required to form the applicative message is embedded inside the respective HDML card. In order to adapt HDML to allow storage of this information, the following tags have been expanded: CE and ACTION, relating respectively to data used to generate a choice entry in a menu and data associating actions with keypresses. A command identifier (such as APPI_call_setup_req) and data arguments (such as a telephone number) necessary to cause the telephone to perform the desired action are added to the above tags.

When the translation unit 60 is passed a Get message for transmission across the APPI, it reads the applicative message content from the Get message and adds an appropriate envelope so that the APPI message will reach the intended destination. Once the envelope is added, the APPI message is complete and is transmitted across the APPI triggering actions and events at the destination according to the applicative message's content. In preparing an envelope for an applicative message for transmission across the APPI, the following fields are determined and added to the message:

length of message (total length of APPI in bytes)

origination address (address of the sender of the APPI message)

destination address (address of the recipient of the message—this is determined by applicative message's identification field).

Figures 3, 4:
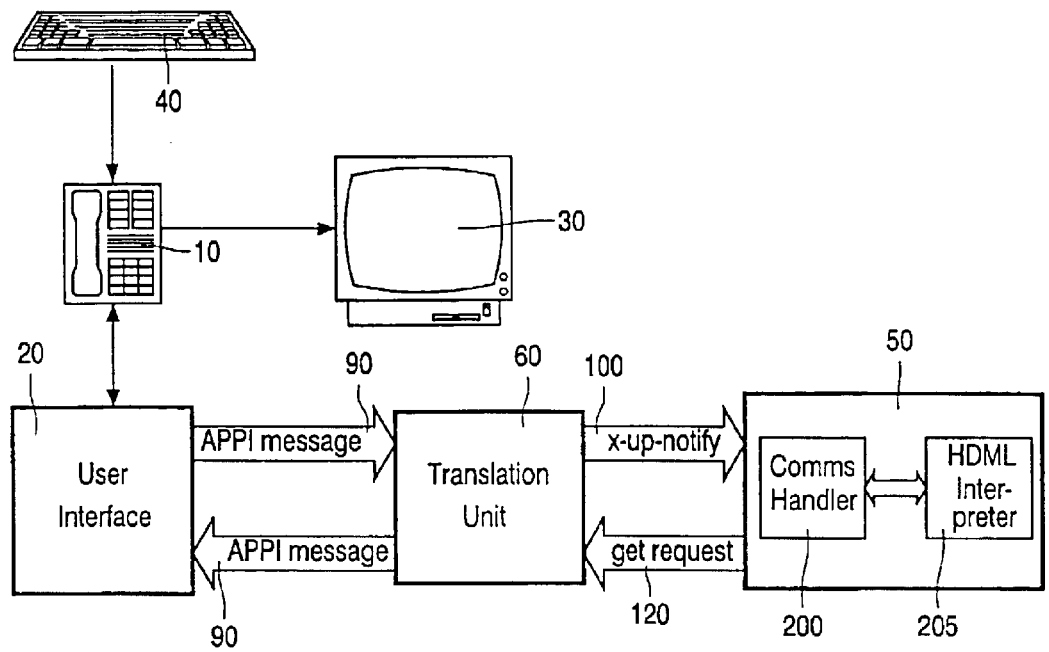
FIG. 3 is a detailed schematic diagram of parts of the system of FIG. 2.
FIG. 4 is a diagram of messages used by the mobile telephone control system of FIGS. 2 and 3.

The format and an example of an enveloped applicative message is shown in FIG. 4.

On-telephone applications communicate via APPI messages by forming the necessary applicative message, packaging it up in an envelope and transmitting it across the APPI. Events generated at the mobile telephone 10, such as incoming calls, SMS messages or battery warnings are transmitted across the APPI as applicative messages and are intercepted by the translation unit 60. Each event is translated into an x-up-notify message which is the means by which HDTP transmits data as and when it becomes available, i.e. not in response to a request made (known as the push model). The message is then passed to the micro-browser's communications handler module. Each message received by the communications handler needs to be transformed into an appropriate HDML deck to cause the appropriate events to occur in the micro-browser, for example display a prompt on screen and/or to play a sound file. The content of the received message is processed according to the system of FIG. 5.

Figure 5:
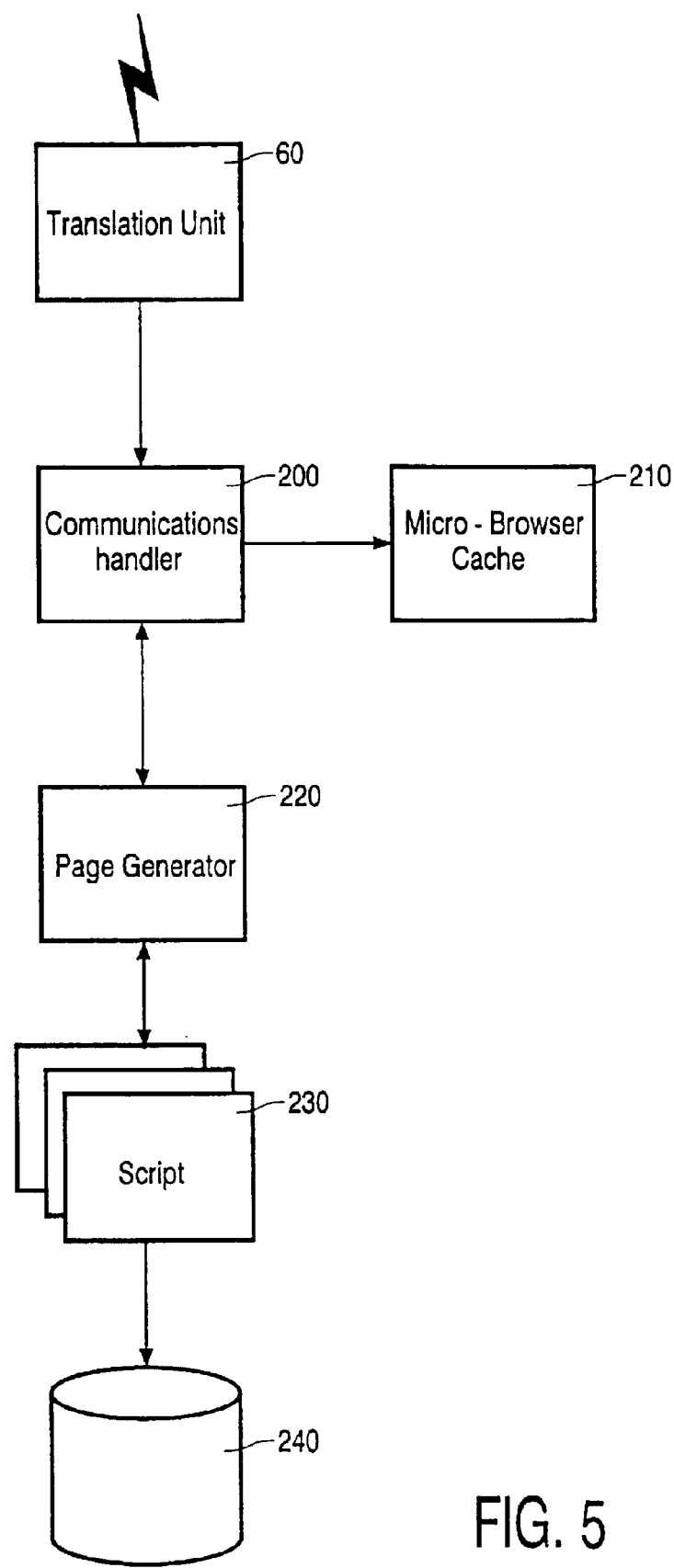
FIG. 5 is a schematic diagram of a page generator for use in the present invention.

FIG. 5 is a schematic diagram of a page generator for use in the present invention. Messages are passed from the translation unit 60 to the communications handler 200. The communications handler 200 processes the message to determine whether it relates to an event generated at the mobile telephone 10 or it contains a received HDML page. If the message contains a received HDML page it is written to the micro-browser's cache 210 for subsequent display. If it is determined that the message relates to an event, in order to generate an appropriate HDML card corresponding to the message, the communications handler 200 passes the message to a page generator 220. For each message type, the page generator runs an associated script 230. The script accesses a database 240 which stores command words that may be included in the event messages. For each command word, the corresponding HDML tag(s) are also stored. The script 230 translates each command word into the corresponding HDML tag(s) and creates an appropriate HDML card. Actions performed by a script are largely dictated by the type and content of the applicative message: for example, an APPI_ss_ussd_ind applicative message contains a string of characters to be displayed on screen and requires only to be added to a card and formatted. However, some applicative messages contain no meaningful content and therefore need to be interpreted. For example, having edited a record in a telephone book application, the APPI_param_save_cnf message is sent to the browser indicating the edited record has been saved correctly. This message is translated by the script to trigger an on-screen message that the record was saved. Once the HDML card is generated, the page generator 220 passes it inside an x-up-notify message to the communications handler 200 which writes the message to the micro-browser's cache 210 for subsequent display or action by the micro-browser.

Further areas of standard UI's not intrinsically supported, or supported to too limited a level, by micro-browsers are audio menus, Idle state handling and Image handling. Audio menus are UI features where audio associated with a menu item is played when browsing the menu. A particular feature of audio menus is that the audio is played until a new item in the menu is selected or the current menu option is selected. This is done by extending the CHOICE tag of HDML cards to include a new, non mandatory, boolean argument audio_menu which is False by default but True when the choice card is being used to represent an audio menu. An applicative message instructs the telephone to play the particular audio associated with the tag when it is selected and stops the audio if another tag is selected or the current tag is selected. A mobile telephone is in an idle state when switched on and standing by to receive an incoming call or user input. Normally, when in an idle state the date, time and name of service provider is displayed. This could be done using an HDML display-type card. However, display-type cards cannot capture user input. In order to overcome this without resulting to entry-type cards with their associated prompts, the DISPLAY tag is extended to include a boolean argument called idle_state. If this argument is True, a keypress causes a transition from the display card to an entry card allowing the user to enter a telephone number to be dialed etc. Finally, the HDML IMG tag is extended to include halign and valign (horizontal alignment and vertical alignment respectively) arguments allowing control of an image's position on screen.

It is preferred that APPI messages from on-phone applications are intercepted by the translation unit which continuously monitors the APPI. However, the applications could be rewritten and explicitly told to direct certain message types across the APPI to the translation unit.

Whilst the above description has been primarily concerned with mobile telephones, the present invention is also applicable for enabling micro-browsers to be used as user-interfaces for other devices such as remote controls, personal data assistants, machinery used on a factory floor or even household appliances such as video recorders, microwave ovens and other control systems. Equally, the principles of the present invention are applicable to many data transmission and display protocols such as WAP (in particular WMLscript-WAP's Scripting language) and should not be limited to HDML.

What is claimed is:

1. A system for controlling an apparatus having a dedicated user interface, parts of the dedicated user interface communicating with each other using a dedicated user interface message protocol, the system comprising a browser adapted to display a generic user interface, to issue requests due to user interaction with the generic user interface and to accept notifications comprising data or events, and a translation system configured to receive issued requests, to translate the requests and to communicate them using the dedicated user interface message protocol to one of the parts of the dedicated user interface, and to receive communications from the parts of the dedicated user interface using the dedicated user interface message protocol, to translate the communications into notifications and to pass them to the browser.

2. A system according to claim 1, in which the browser includes a communications handler configured to accept notifications comprising data or events and to issue the requests due to user interaction with the generic user interface, wherein the communications handler determines the request type and if the request relates to World Wide Web browsing the communications handler transmits the request to a World Wide Web server, otherwise the communications handler passes the request to the translation system.

3. A system according to claim 2, in which the browser is a World Wide Web micro-browser.

4. A system according to claim 3, in which the browser is an HDML micro browser.

5. A system according to claim 4, in which requests issued due to user interaction with the generic user interface comprise HDML Get messages.

6. A system according to claim 5, in which requests relating to the generic user interface comprise applicative messages embedded within the HDML Get messages.

7. A system according to claim 6, in which the translation system is configured to retrieve the applicative message from the HDML Get messages, attach it to an electronic delivery envelope determined in dependence on the type of the applicative message in accordance with the dedicated user interface message protocol and to communicate it to one of the parts of the dedicated user interface.

8. A system according to claim 4, in which notifications comprise HDML x-up-notify messages.

9. A system according to claim 8, in which notifications relating to the generic user interface comprise applicative messages embedded within the HDML x-up-notify messages.

10. A system according to claim 9, in which a received communication from the parts of the dedicated user interface comprise one or more applicative messages attached to an electronic delivery envelope in accordance with the dedicated user interface message protocol, wherein the translation system is configured to retrieve the applicative message(s), embed them within an x-up-notify message and pass the message to the communications handler.

11. A system according to claim 10, in which the communications handler includes a page generator, wherein the communications handler passes received x-up-notify messages to the page generator which, in dependence on the embedded applicative message(s) generates an HDML page and passes the HDML page within an x-up-notify message to the browser for action.

12. A computer readable storage medium including a program of instructions encoding the system of claim 1.

13. A method of controlling an apparatus having a dedicated user interface from a browser, parts of the dedicated user interface communicating with each other using a dedicated user interface message protocol, the method comprising the steps of displaying a generic user interface on the browser;

issuing requests from the browser due to user interaction and accepting notifications comprising data or events;

translating and communicating requests using the dedicated user interface message protocol to one of the parts of the dedicated user interface; and, receiving communications from the parts of the dedicated user interface using the dedicated user interface message protocol, translating the communications into notifications and passing them to the browser.

14. A method according to claim 13, further comprising the step of routing notifications and requests via a communications handler, wherein the communications handler determines the request type and if the request relates to World Wide Web browsing the communications handler transmits the request to a World Wide Web server, otherwise the communications handler passes the request to a translation system.

15. A method according to claim 13, further comprising the step of generating HDML pages in dependence on received x-up-notify messages and passing the HDML pages within x-up-notify messages to the browser for action.

16. A method according to claim 13, wherein the step of issuing requests from the browser further comprises determining a type for a request, and transmitting the request to a World Wide Web server if the request is determined to relate to World Wide Web browsing.

17. A method according to claim 13, wherein the browser comprises an HDML browser, requests issued from the browser comprise applicative messages embedded within HDML Get messages, and the step of translating requests further comprises the steps of retrieving the applicative message from the HDML Get message and attaching it to an electronic delivery envelope determined in dependence on the type of the applicative message in accordance with the dedicated user interface message protocol.

18. A method according to claim 13, wherein the browser comprises an HDML browser, the notifications comprise HDML x-up-notify messages, the communications from the parts of the dedicated user interface comprises an applicative message attached to an electronic delivery envelope in accordance with the dedicated user interface message protocol, and the step of translating communications into notifications further comprises retrieving the applicative message, and embedding the applicative message within an x-up-notify message.

19. A method according to claim 18, wherein the step of translating communications into notifications further comprises generating an HDML page in dependence on the retrieved applicative message, and passing the HDML page to the browser within an x-up-notify message.

20. A computer readable storage medium including a program of instructions encoding the method of claim 13.

* * * * *